United States Patent
Hakola et al.

(10) Patent No.: US 12,413,367 B2
(45) Date of Patent: Sep. 9, 2025

(54) CORESET ARRANGEMENT FOR NARROWBAND NEW RADIO

(71) Applicant: NOKIA TECHNOLOGIES OY, Espoo (FI)

(72) Inventors: Sami-Jukka Hakola, Kempele (FI); Esa Tapani Tiirola, Oulu (FI); Karri Markus Ranta-Aho, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/932,537

(22) Filed: Oct. 30, 2024

(65) Prior Publication Data

US 2025/0055645 A1   Feb. 13, 2025

Related U.S. Application Data

(63) Continuation of application No. PCT/EP2022/066544, filed on Jun. 17, 2022.

(51) Int. Cl.
*H04W 72/231* (2023.01)
*H04L 5/00* (2006.01)
*H04W 48/10* (2009.01)

(52) U.S. Cl.
CPC ................. *H04L 5/0053* (2013.01)

(58) Field of Classification Search
CPC ..... H04L 5/0053; H04L 5/0094; H04W 48/10
See application file for complete search history.

(56) References Cited

U.S. PATENT DOCUMENTS

| | | | | |
|---|---|---|---|---|
| 11,838,132 | B2* | 12/2023 | Yeo | H04L 1/1812 |
| 2019/0253124 | A1* | 8/2019 | Awada | H04L 1/1621 |
| 2019/0349149 | A1* | 11/2019 | Nam | H04W 72/23 |
| 2021/0014893 | A1* | 1/2021 | Park | H04L 5/0092 |
| 2021/0274521 | A1* | 9/2021 | Yuan | H04L 1/0038 |
| 2022/0174624 | A1* | 6/2022 | Wu | H04L 5/0094 |

(Continued)

FOREIGN PATENT DOCUMENTS

| | | |
|---|---|---|
| EP | 4037230 A1 | 8/2022 |
| EP | 4364337 A1 | 5/2024 |

(Continued)

OTHER PUBLICATIONS

3GPP TSG RAN WG1#90, R1-1913538 Title:Summary of discussion on SS/PBCH block indexing (Year: 2019).*

(Continued)

*Primary Examiner* — Faruk Hamza
*Assistant Examiner* — Abusayeed M Haque
(74) *Attorney, Agent, or Firm* — ALSTON & BIRD LLP

(57) ABSTRACT

Various techniques are provided for a method including triggering, by a user equipment (UE), a resource block (RB) offset allocation determination, detecting, by the UE, at least one of a primary synchronization signal (PSS) and a secondary synchronization signal (SSS) in a received synchronization signal (SS) block (SSB), reading, by the UE, a physical broadcast channel (PBCH) parameter and a signaled offset from a master information block of a PBCH of the SSB, determining, by the UE, an RB offset based on the PBCH parameter and the signaled offset, and determining, by the UE, a control resource set frequency location based on the RB offset.

12 Claims, 8 Drawing Sheets

(56) References Cited

U.S. PATENT DOCUMENTS

2022/0329363 A1* 10/2022 Lee .................. H04L 1/1854
2023/0239120 A1* 7/2023 Uziel ................ H04L 5/0048
370/329

FOREIGN PATENT DOCUMENTS

| EP | 4483522 A1 | 1/2025 | |
|----|------------|--------|---|
| WO | WO-2021066633 A1 * | 4/2021 | .......... H04J 11/0069 |
| WO | WO 2023/274491 A1 | 1/2023 | |
| WO | WO 2023/122806 A2 | 6/2023 | |

OTHER PUBLICATIONS

3GPP TSG RAN WG1 Meeting#93,, R1-1806857 Title:Aspects related to collision handling for subslot-PUSCH (Year: 2018).*

International Search Report and Written Opinion for International Application No. PCT/EP2022/066544, mailed on Feb. 8, 2023, 13 pages.

"3rd Generation Partnership Project; Technical Specification Group Radio Access Network; NR; Physical layer procedures for control (Release 17)", 3GPP TS 38.213 V17.1.0, (Mar. 2022), 245 pages.

Baker, M., "5G NR for FRMCS: Standardisation in 3GPP UK Spectrum Policy Forum Cluster 1 event: Future Spectrum Demand for Rail", (Mar. 29, 2022), 14 pages.

Ericsson, "Coexistence of LTE-MTC with NR", 3GPP TSG RAN WG1 Meeting #98, R1-1908021, (Aug. 26-30, 2019), 12 pages.

Huawei, "Moderator's summary for discussion [RAN94e-R18Prep-22]", 3GPP TSG-RAN Meeting #94-e, RP-212682, (Dec. 6-17, 2021), 243 pages.

Nokia et al., "Railway, Smart Grid and PPDR support in Rel-18", RAN Rel-18 Workshop, RWS-210121, (Jun. 28-Jul. 2, 2021), 6 pages.

OPPO, "Simulation and evaluation for RedCap enhancement", 3GPP TSG RAN WG1 #109-e, R1-2203996, (May 9-20, 2022), 5 pages.

Qualcomm, "Views on <5MHz NR in dedicated spectrum for Rel-18", 3GPP TSG RAN#93e, RP-211942, (Sep. 13-17, 2021), 8 pages.

Spreadtrum Communications, "Discussion on potential solutions to further reduce UE complexity", 3GPP TSG RAN WG1 #109-e, R1-2203338, (May 9-20, 2022), 17 pages.

ZTE et al, "Discussion on spectrum less than 5MHz in Rel-18" 3GPP TSG RAN Meeting #93-e, RP-212387, (Sep. 13-17, 2021), 4 pages.

* cited by examiner

CORESET ARRANGEMENT FOR NARROWBAND NEW RADIO

CROSS REFERENCE TO RELATED APPLICATION

This application is a continuation of, and claims the benefit of, International Application No. PCT/EP2022/066544 filed on Jun. 17, 2022, which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a device, a system, a non-transitory computer-readable medium (having stored thereon computer executable program code which can be executed on a computer system), and/or a method can perform a process including determining a control resource set (CORESET) frequency location from a punctured synchronization signal block according to an example embodiment. A method may include triggering, by a user equipment (UE), a resource block (RB) offset allocation determination, detecting, by the UE, at least one of a primary synchronization signal (PSS) and a secondary synchronization signal (SSS) in a received synchronization signal (SS) block (SSB), reading, by the UE, a physical broadcast channel (PBCH) parameter and a signaled offset from a master information block (MIB) of a PBCH of the SSB, determining, by the UE, an RB offset based on the PBCH parameter and the signaled offset, and determining, by the UE, a control resource set (CORESET) frequency location based on the RB offset.

Implementations can include one or more of the following features. For example, the PBCH parameter can be a subcarrier offset (k_SSB). The triggering of the RB offset allocation determination can be based on a pre-defined synch raster point. The triggering of the RB offset allocation determination can be based on a radio frequency (RF) channel. The RB offset can be a difference between a low edge of one of the PSS or the SSS and a low edge of the CORESET. The RB offset can be a difference between a low edge of the SSB and a low edge of the CORESET.

The PBCH parameter can be a k_SSB and the RB offset can be determined using a table including the k_SSB and the signalled offset. The RB offset can be determined using a table including an index signalled in the MIB. The SSB can include at least one Physical Resource Block (PRB) that has been punctured. The SSB can include five (5) PRBs that has been punctured with at least one PRB punctured on each side of the PBCH. The SSB can be a punctured SSB and the determined CORESET frequency location, in frequency, can be aligned with at least one of a low end of the CORESET can be aligned with a low end of the punctured SSB, a CCE boundary of the CORESET can be aligned with the low end of the punctured SSB, or the CCE boundary of the CORESET can be aligned with a high end of the punctured SSB. The method can further include monitoring, by the UE, a Type0_PDCCH from the determined CORESET. The method can further include in response to detecting PDCCH for SIB1, receiving, by the UE, PDSCH based on the detected PDCCH.

According to another example embodiment, a device, a system, a non-transitory computer-readable medium (having stored thereon computer executable program code which can be executed on a computer system), and/or a method can perform a process including determining a control resource set (CORESET) frequency location from a punctured synchronization signal block according to an example embodiment. A method may include determining, by a network device, a control resource set (CORESET) frequency location based on a Physical Resource Block (PRB) puncturing pattern, determining, by the network device, a resource block (RB) offset based on the CORESET location, signaling, by the network device, a physical broadcast channel (PBCH) parameter and a signaled offset configured to indicate the RB offset in a master information block (MIB) of a PBCH of a synchronization signal (SS) block (SSB), and communicating, by the network device, the SSB.

Implementations can include one or more of the following features. For example, the PBCH parameter can be a subcarrier offset (k_SSB). The RB offset can be a difference between a low edge of one of a primary synchronization signal (PSS) or a secondary synchronization signal (SSS) and a low edge of the CORESET. The RB offset can be a difference between a low edge of the SSB and a low edge of the CORESET. The PBCH parameter can be a k_SSB and the RB offset can be determined using a table including the k_SSB and the signaled offset. The RB offset can be determined using a table including an index signaled in the MIB. The SSB can include at least one Physical Resource Block (PRB) that has been punctured. The SSB can include five (5) PRBs that has been punctured with at least one PRB punctured on each side of the PBCH. The determined CORESET frequency location, in frequency, can be aligned with at least one of a low end of the CORESET can be aligned with a low end of the punctured SSB, a CCE boundary of the CORESET can be aligned with the low end of the punctured SSB, or the CCE boundary of the CORE-SET can be aligned with a high end of the punctured SSB.

The details of one or more examples of embodiments are set forth in the accompanying drawings and the description below. Other features will be apparent from the description and drawings, and from the claims.

DETAILED DESCRIPTION

Figure 1:
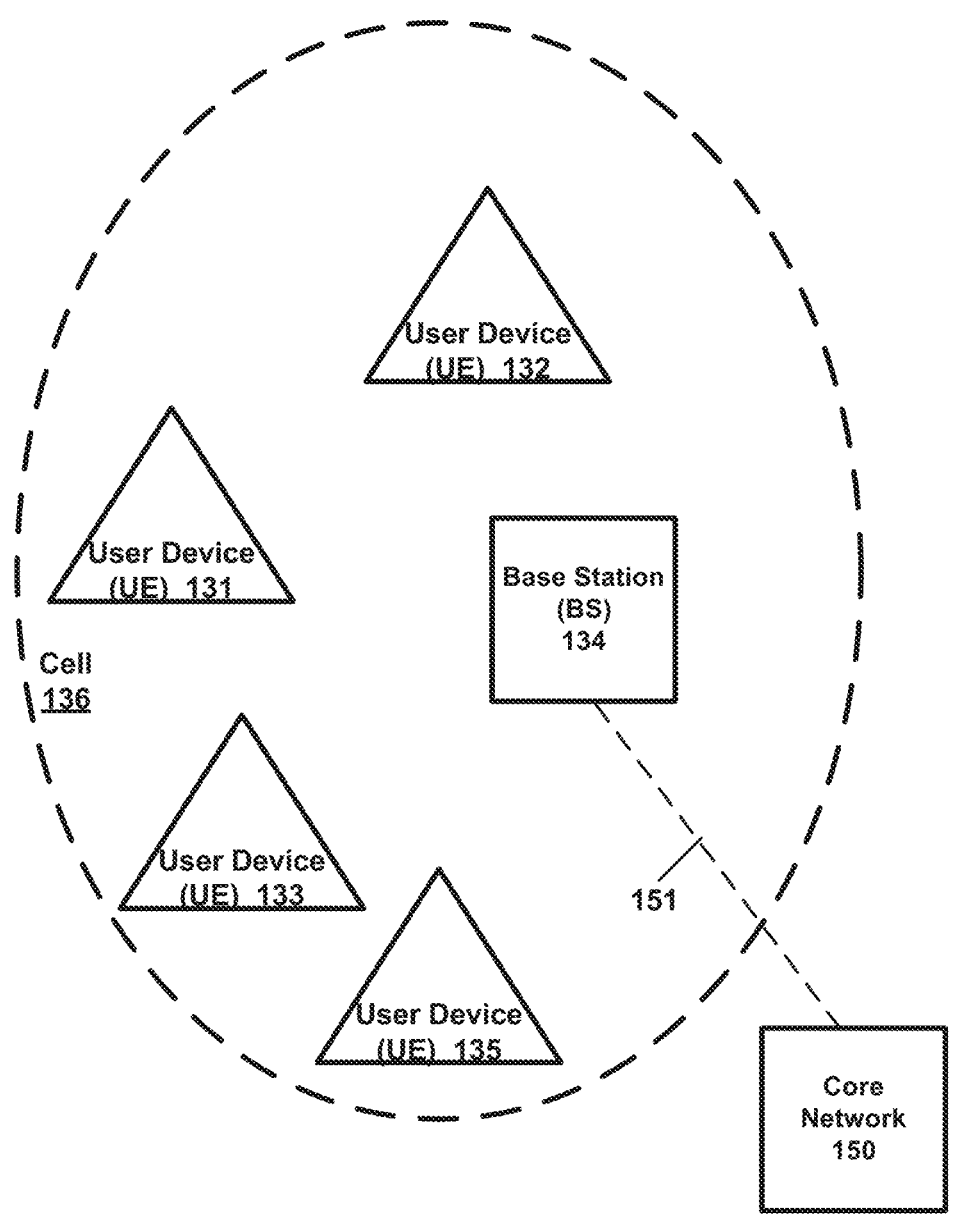
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node. For example, a BS (or gNB) may include: a distributed unit (DU) network entity, such as a gNB-distributed unit (gNB-DU), and a centralized unit (CU) that may control multiple DUs. In some cases, for example, the centralized unit (CU) may be split or divided into: a control plane entity, such as a gNB-centralized (or central) unit-control plane (gNB-CU-CP), and an user plane entity, such as a gNB-centralized (or central) unit-user plane (gNB-CU-UP). For example, the CU sub-entities (gNB-CU-CP, gNB-CU-UP) may be provided as different logical entities or different software entities (e.g., as separate or distinct software entities, which communicate), which may be running or provided on the same hardware or server, in the cloud, etc., or may be provided on different hardware, systems or servers, e.g., physically separated or running on different systems, hardware or servers.

As noted, in a split configuration of a gNB/BS, the gNB functionality may be split into a DU and a CU. A distributed unit (DU) may provide or establish wireless communications with one or more UEs. Thus, a DUs may provide one or more cells, and may allow UEs to communicate with and/or establish a connection to the DU in order to receive wireless services, such as allowing the UE to send or receive data. A centralized (or central) unit (CU) may provide control functions and/or data-plane functions for one or more connected DUs, e.g., including control functions such as gNB control of transfer of user data, mobility control, radio access network sharing, positioning, session management etc., except those functions allocated exclusively to the DU. CU may control the operation of DUs (e.g., a CU communicates with one or more DUs) over a front-haul (Fs) interface.

According to an illustrative example, in general, a BS node (e.g., BS, CNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM) (which may be referred to as Universal SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node. As an example, a UE can be mounted on a train in a Future Railway Mobile Communication System (FRMCS).

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network (e.g., which may be referred to as 5GC in 5G/NR).

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), massive MTC (mMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans.

Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G (New Radio (NR)), 5G Advanced, Narrowband New Radio operation (NB NR), cmWave, and/or mm Wave band networks, IoT, MTC, eMTC, mMTC, eMBB, URLLC, etc., or any other wireless network or wireless technology. These example networks, technologies or data service types are provided only as illustrative examples.

A UE may be configured by a gNB (or other network node) to perform different measurements and measurement reporting to the network (or gNB(s)). A configuration of a UE to perform reference signal (or beam) measurement (e.g., such as CSI-RS measurement for different beams) and reporting may be performed by a gNB sending a report configuration (e.g., such as a CSI-Report-Config) to the UE. A report configuration, for example, may indicate downlink resource(s) on which measurements should be performed (e.g., CSI-RS reference signals/SSBs, or beams), specific quantities or parameters to be measured, and how the reporting is to be performed, such as when the reporting is done, etc.

5G Advanced may be the next evolutionary step in 5G technology. 5G Advanced may add enhanced capabilities beyond connectivity and enable a wider set of advanced use cases for verticals. 5G Advanced can support advanced applications with enhanced mobility and high reliability as well as artificial intelligence (AI) and machine learning (ML) that will improve network performance. 5G Advanced can introduce improvements in spectral efficiency and energy savings. 5G Advanced may create a foundation for more demanding applications and a wider range of use cases than ever before with a truly immersive user experience based on extended reality (XR) features. 5G Advanced may introduce AI and ML enhancements across the RAN, Core, and network management layer for improved performance, network optimization, and energy efficiency. 5G Advanced may be backwards compatible including the ability to serve legacy 5G devices. 5G Advanced may add capabilities related to XR (e.g., AR, VR, gaming), enhanced coverage and MIMO performance, replacing GSM-R, new types of devices, cellular-based positioning, time synchronization, network operation efficiency (e.g., using AI and ML technologies), enhanced sidelink, enhanced mobility, and the like. Enabling a new radio based mission critical network for spectrum allocations below 5 MHZ can be an example of the new 5G Advanced functionalities being considered.

A UE may measure a signal parameter(s) (e.g., such as a reference signal received power (RSRP)) of each of a plurality of downlink reference signals (e.g., such as synchronization signal block/SSB signals, or channel state information (CSI)-reference signals (CSI-RS)) received by the UE from the gNB/network node (or BS), where each reference signal may be transmitted by the gNB via a different gNB transmit beam (or via a different downlink DL reference signal). The UE may determine the strongest beams or reference signals (e.g., having a highest RSRP), and then may send a measurement report to the gNB that may identify the strongest N DL reference signals (or beams), and the RSRP (or other measured signal parameter) of these N beams, for example. The gNB may use this measurement report to determine what beam to use to communicate with the UE, for example.

According to an example embodiment, a PDCCH (physical downlink control channel) may be transmitted using 1, 2, 4, 8 or 16 control-channel elements (CCEs), where the number of CCEs may be referred to as the aggregation level (or CCE aggregation level). The CCEs can be aggregated to include a PDCCH candidate and can be a contiguous or a non-contiguous set of resources in frequency. A Resource Element Group (REG) bundle can be frequency contiguous. However, a CCE that includes multiple REG bundles may be contiguous or non-contiguous (i.e., interleaved or non-interleaved CCE-to-REG mapping). According to an example embodiment, a CCE is a building block of a PDCCH, where a CCE may be a smallest set of resources that can be used for a PDCCH. For example, a CCE may be a unit upon which search spaces for blind decoding may be defined. Thus, each PDCCH may include one or more CCEs, depending on the aggregation level. According to an example embodiment, a CCE may include 6 resource element groups (REGs), each of which may include one resource block in an OFDM symbol.

A search space may include a set of candidate PDCCHs (candidate downlink control channels) formed by CCEs at given aggregation level(s), which the UE is supposed to attempt to decode. A UE may have multiple search spaces for different purposes (such as different common search spaces, and user-specific search spaces). A search space may be associated with one or more control resource sets (CORESETs). A CORESET may be (or may include) the time-frequency resources upon which a PDCCH(s) is transmitted. There can be multiple search spaces using a same control resource set (CORESET), and there can be multiple CORESETs configured for a UE. Also, a control resource set (CORESET) may be (or may include) time-frequency resources in which the UE tries to decode candidate PDCCHs using one or more search spaces. A UE may be configured with up to four bandwidth parts (BWPs) per serving cell, where different BWPs may be configured with different numerologies, and a gNB may switch between the different BWPs by configuration or dynamically by a Downlink Control Information (DCI) message. One BWP can be active at a given time, and up to three (3) CORESETs and up to ten (10) Search Space Sets (SS-Sets) can be configured per BWP. CORESETs can be confined within the bandwidth of the BWP, because the UE may be constrained to receive/transmit only within the BW of its active BWP. On an active BWP, a UE may be configured to monitor up to three unicast DCI format sizes and up to four DCI format sizes in total.

Figure 2A:
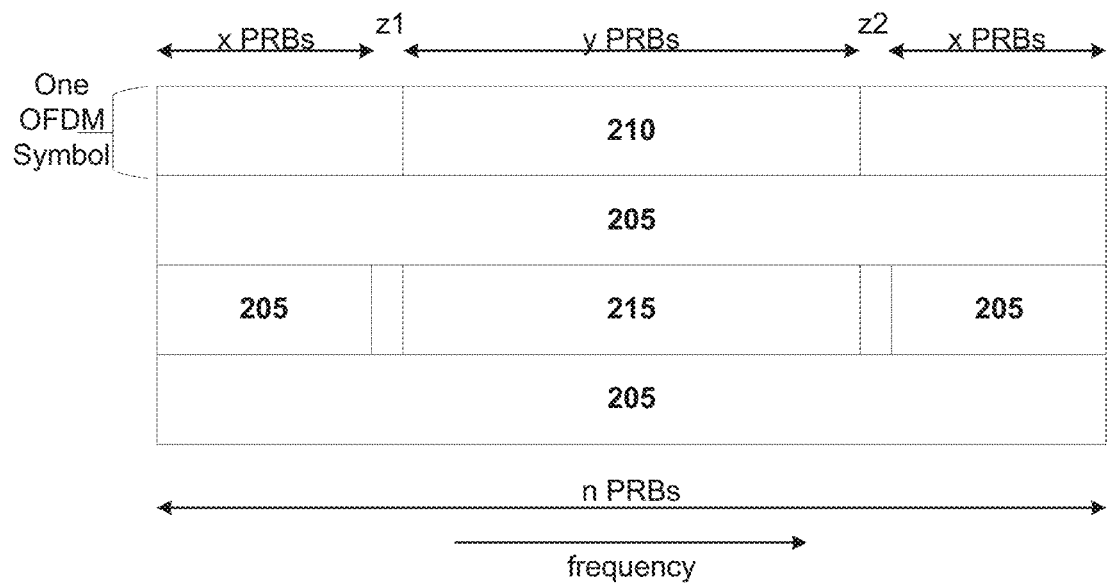
FIG. 2A is a block diagram illustrating a synchronization signal block according to an example embodiment.

FIG. 2A is a block diagram illustrating a synchronization signal block according to an example embodiment. The synchronization signal block, SSB, or SSB subcarriers can include a Physical Broadcast Channel (PBCH) 205, a Primary Synchronization Signal (PSS) 210, and a Secondary Synchronization Signal (SSS) 215. The SSB subcarriers can be configured to enable UE's to find a cell when entering a system and for finding new cells when moving within the system. The SSB subcarriers can be periodically transmitted on the downlink from each NR cell. The SSB subcarriers can be based on OFDM and transmitted on a set of time/frequency resources or resource elements within an OFDM time-frequency resource grid. There can be multiple gNB Tx beam-specific SSBs per cell. FIG. 2A illustrates a time/frequency structure of an SSB. An SSB can span four (4) OFDM symbols in the time domain and 240 subcarriers in the frequency domain.

As shown in FIG. 2A, the SSB subcarriers can include n physical resource blocks or PRBs in the frequency domain. The SSB can occupy 240 subcarriers and one (1) PRB can include 12 subcarriers when the SSB subcarriers are aligned to the PRB subcarriers. Therefore, n can equal 20 and the SSB subcarriers can occupy 20 PRBs in the frequency domain. The PSS 210 can be in the first OFDM symbol of the SSB subcarriers and occupy 127 subcarriers or 12 PRB subcarriers (e.g., y=12). The SSS 215 can be in the third OFDM symbol of the SSB subcarriers and can occupy the same 127 subcarriers or 10 PRBs as the PSS 210. The PBCH 205 can be in the second and fourth OFDM symbol of the SSB subcarriers and occupy 240subcarriers or 20 PRB subcarriers (e.g., n=20). The PBCH 205 can also occupy the 48 subcarriers or 12 PRB subcarriers (e.g., x=4) on each side of the SSS 215. There can be unused subcarriers between the PBCH 205 and the SSS215 shown in FIG. 2A as z1 and z2. In an example implementation, z1 can be 8 subcarriers and z2 can be 9 subcarriers. In the example illustrated in FIG. 2A, x+z1+y+z2+x=n (e.g., 48+8+127+9+48=240 (or 20 PRBs)). Different numerologies (e.g., values for n, x, y, z1 and 22) can be used in an SSB subcarriers.

Example implementations can relate to narrowband new radio operation (NB NR) or NR support for dedicated spectrum less than 5 MHz. This is an emerging scenario driven by future of, for example, railway communications, smart grid operators, public safety, and the like. Example implementations can target use of NR in 3-5 MHz spectrum allocations. In other words, example implementations can enable the operation of 5G NR in a narrower bandwidth than the 5 MHz channels for which it was originally designed (e.g., down to 3 MHZ). For example, deployment of NR in the 900 MHz FRMCS (Future Railway Mobile Communication System) band can take place alongside legacy GSM-R carriers within a 5.6 MHz bandwidth, which permits only about 3.6 MHz to be used for NR. Similarly, there are some cases where only 3 MHz channels are available for NR. The signals and channels transmitted, more specifically signals and channels of the synchronization signal and PBCH block (SSB), by the NR base stations (gNBs) were not designed for transmission in such narrow channels. However, the x PRB's (e.g., the 4 PRB's each side of the SSS 215, PSS 210 and the corresponding PRB's of PBCH 205) shown in FIG. 2A can be used (e.g., using puncturing) in order to provide NR support for dedicated spectrum less than 5 MHz. In an example implementation, asymmetric puncturing can be used (e.g., 15 PRBs used for the puncturing) such that a different number PRB's are punctured (e.g., 1 and 4, 2 and 3, 3 and 2, and 4 and 1 PRBs) on each side of the SSS 215, PSS 210

After detecting the PSS and SSS the UE can determine, in addition to the physical cell ID, the slot timing within a 5 ms half frame and the symbol timing. The UE can then determine resource elements for the PBCH DMRS and data to receive PBCH payload. PBCH carries Master Information Block (MIB) signaling system information related to the frequency position (SSB frequency domain allocation related to a common resource block (CRB) grid) and timing (half frame timing and frame timing). The information is contained either in higher layer payload (i.e., MIB), as a part of the physical layer bits in the transport block payload, or in DMRS.

After the UE has detected the PSS and the SSS and demodulated the PBCH, the UE can read a configuration index from the PBCH/MIB. The configuration index can refer to a CORESET (e.g., CORESET #0) configuration table, and to time and frequency resource allocation parameters. One of the parameters defines the RB offset between the first PRB of the CORESET and the first PRB in which the first subcarrier of the SSB subcarriers is located (the SSB is in the same subcarrier raster but not necessarily in the same RB raster as CORESET). Different puncturing patterns can be applied to the SSB (discussed below with regard to FIG. 3). The different puncturing patterns can depend, for example, on the RF channel and/or synchronization raster point.

A problem can be that partial CCEs available can occur at both ends of the CORESET #0 due to the puncturing patterns. Channel estimation can suffer from partial CCEs due to low noise averaging possibility. PDCCH may apply to only one DMRS port. In some implementations, transmit diversity can be provided using precoder cycling (e.g., implemented by the gNB). For example, in the precoder cycling the gNB may vary the Tx antenna phasing (with respect to each other) with the CCE granularity. Therefore, PDCCH Channel estimation can be be done separately for each CCE. In other words, there is no phase continuity between CCEs, therefore, the channel may be uncorrelated between CCEs. In addition, the UE can filter (or average) the channel estimates within one CCE. This can lead to lower detection and decoding performance for PDCCH. Therefore, some performance degradation (compared to non-punctured case) can occur. As a solution example implementations propose a signaling mechanism and corresponding UE operation for the allocation of the CORESET #0 such that partial CCEs are avoided with different puncturing patterns.

In example implementations, the UE can demodulate and decode the PBCH (e.g., PBCH 205) with a 12 PRB assumption. This can mean that the UE assumes only the 12 full PRBs that overlap in frequency domain with the PSS and SSS are valid for the PBCH demodulation and decoding, while the presence of the other PRBs is unknown and thus not assumed. Pre-defined synch raster point(s) or certain RF channel can be used to trigger the new offset and CORESET allocation determination operation by the UE. FIGS. 2A-2D can be used to describe example implementations for determining a CORESET (e.g., CORESET #0) frequency location in a SSB subcarriers such that partial CCEs are avoided with different puncturing patterns. This technique can be triggered based on a radio frequency (RF) channel and/or pre-defined synchronization raster point(s).

Figure 2B:
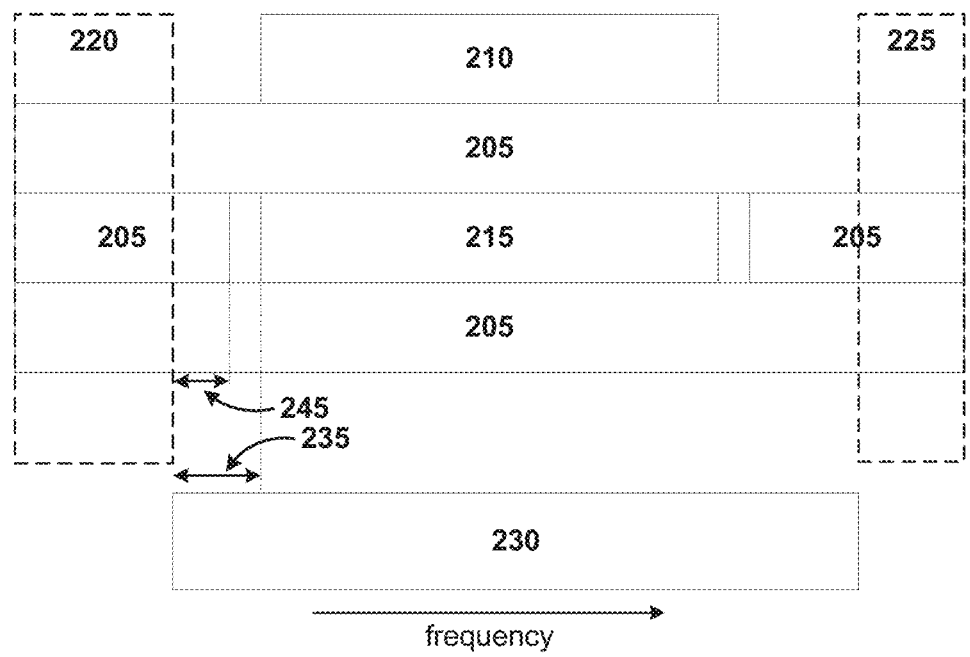
FIG. 2B is a block diagram illustrating a resource block offset in a punctured synchronization signal block according to an example embodiment.

FIG. 2B is a block diagram illustrating a resource block offset in a punctured synchronization signal block according to an example embodiment. As shown in FIG. 2B, the SSB subcarriers include punctured PRBs 220, 225 on each side of the PSS 210 and the SSS 215. The punctured PRBs 220, 225 include puncturing PBCH 205. The SSB has a resource block (RB) offset 235 that can be the difference between low edge of PSS 210/SSS 215 and low edge of a CORESET 230 (e.g., CORESET #0). The RB offset can be derived from a signaled offset and a PBCH parameter (e.g., k_SSB) based on table 1. The ending point of valid PRBs in frequency can be a right edge of the SSS 215 and a full CCE. In other words, the ending point is 15 PRBs with 2 symbol and 14 PRBs with 3 symbol. Therefore, partial CCEs can be avoided at the CORESET edges. RB offset 245 can also be between a low edge of a CORESET 230 and a low edge of a PRB in which the first unused subcarrier of PSS/SSS is located. In other words, the frequency domain offset between the first subcarrier of CORESET 230 and first used subcarrier of SSS 215 can be RB offset 245+SC offset+8 unused subcarriers.

TABLE 1

| Offset from table | PBCH parameter | RB offset | SC offset |
| --- | --- | --- | --- |
| 0 | 0, . . . , 11 | 0 | 0, . . . , 11 |
| 0 | 12, . . . , 23 | 1 | 0, . . . , 11 |
| 2 | 0, . . . , 11 | 2 | 0, . . . , 11 |
| 4 | 12, . . . , 23 | 3 | 0, . . . , 11 |

Figure 2C:
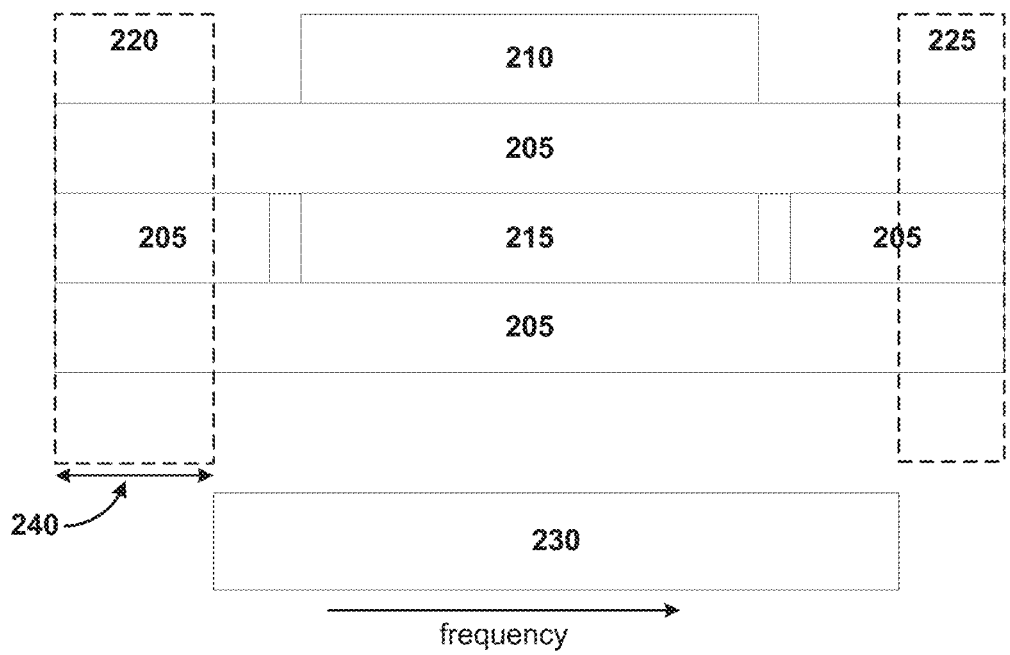
FIG. 2C is a block diagram illustrating a resource block offset in a punctured synchronization signal block according to an example embodiment.

FIG. 2C is a block diagram illustrating a resource block offset in a punctured synchronization signal block according to an example embodiment. As shown in FIG. 2C, the SSB subcarriers include punctured PRBs 220, 225 on each side of the PSS 210 and the SSS 215. The punctured PRBs 220, 225 include puncturing PBCH 205. The SSB subcarriers have an RB offset 240 that can be the difference between a low edge of a hypothetical non-punctured SSB subcarriers and a low edge of CORESET by using the existing offsets and PBCH parameter (e.g., k_SSB). The RB offset can be derived from a signaled offset and a PBCH parameter (e.g., k_SSB) based on table 2. The ending point of valid PRBs in frequency can be a right edge of the SSS 215 and a full CCE. In other words, the ending point is 15 PRBs with 2 symbol and 14 PRBs with 3 symbol CORESET size in number of time domain symbols. Therefore, partial CCEs can be avoided.

TABLE 2

| Offset from table | PBCH parameter | RB offset | SC offset |
| --- | --- | --- | --- |
| 0 | 12, . . . , 23 | −1 | 0, . . . , 11 |
| 2 | 12, . . . , 23 | −2 | 0, . . . , 11 |
| 4 | 0, . . . , 11 | −3 | 0, . . . , 11 |
| 4 | 12, . . . , 23 | −4 | 0, . . . , 11 |

Figure 2D:
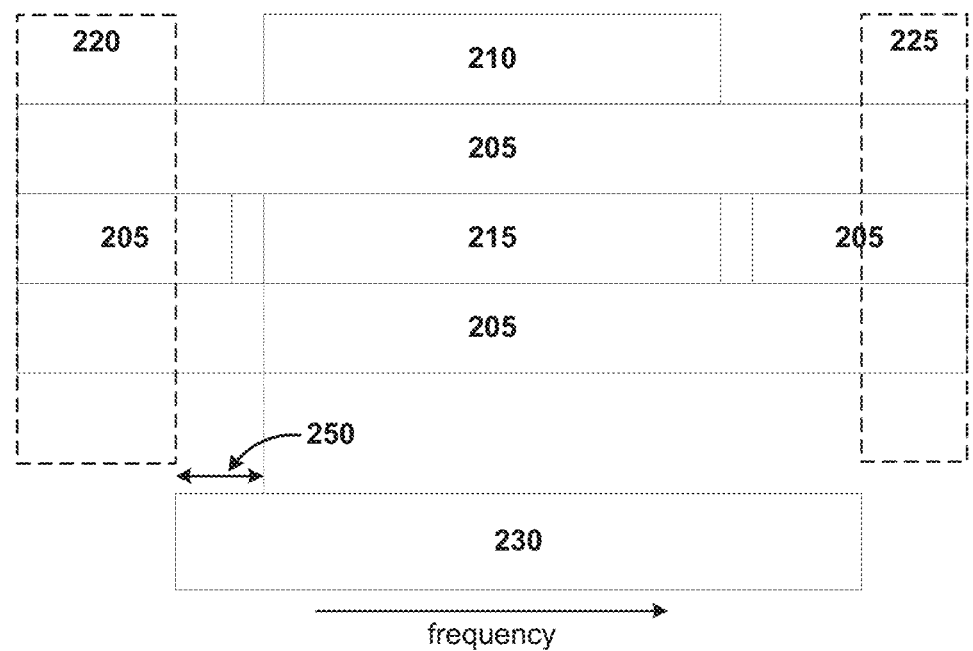
FIG. 2D is a block diagram illustrating a resource block offset in a punctured synchronization signal block according to an example embodiment.

FIG. 2D is a block diagram illustrating a resource block offset in a punctured synchronization signal block according to an example embodiment. As shown in FIG. 2D, the SSB subcarriers include punctured PRBs 220, 225 on each side of the PSS 210 and the SSS 215. The punctured PRBs 220, 225 include puncturing PBCH 205. The SSB subcarriers have an RB offset 250 that can be the difference between a low edge of PSS 210/SSS 215 and a low edge of a CORESET 230 (e.g., CORESET #0). The RB offset can be derived from a signaled index in the PBCH MIB based on table 3. The ending point of valid PRBs in frequency can be a right edge of the SSS 215 and a full CCE. In other words, the ending point is 15 PRBs with 2 symbol and 14 PRBs with 3 symbol CORESET size in time domain symbols. Therefore, partial CCEs can be avoided.

TABLE 3

| Index | MUX pattern | Num. of PRBs | Num. of symbols | RB offset |
| --- | --- | --- | --- | --- |
| 0 | 1 | 24 | 2 | 0 |
| 1 | 1 | 24 | 2 | 1 |
| 2 | 1 | 24 | 2 | 2 |
| 3 | 1 | 24 | 2 | 3 |

TABLE 3-continued

| Index | MUX pattern | Num. of PRBs | Num. of symbols | RB offset |
|---|---|---|---|---|
| 4 | 1 | 24 | 3 | 0 |
| 5 | 1 | 24 | 3 | 1 |
| 6 | 1 | 24 | 3 | 2 |
| 7 | 1 | 24 | 3 | 3 |

The benefits of the techniques described with regard to FIGS. 2A-2D can include, at least, an efficient process to configure CORESET (e.g., CORESET #0) when the SSB subcarriers need to be punctured avoiding partial CCEs. This can improve Type0-PDCCH reception performance. A straightforward implementation, for the UE by providing a new interpretation of the signaled offset and a PBCH parameter, can support a flexible frequency location for the CORESET (e.g., CORESET #0) with respect to the PSS/SSS and the punctured PBCH while allocating CORESET with full CCEs.

Three (3) MHz allocation in a NR system can include a maximum 15 PRB channel bandwidth (e.g., assuming 90% spectrum utilization). Therefore, 5 PRB puncturing of the SSB may be necessary. According to an example implementations, the PSS/SSS should remain unaffected and the puncturing should only apply to the PBCH part of the SSB. Therefore, a maximum of four (4) PRB puncturing on each side of the can be used. In other words, applicable puncturing patterns can be (e.g., low frequency side and high frequency side of the PSS/SSS) 1+4, 2+3, 3+2, 4+1 as illustrated in FIG. 3.

Figure 3:
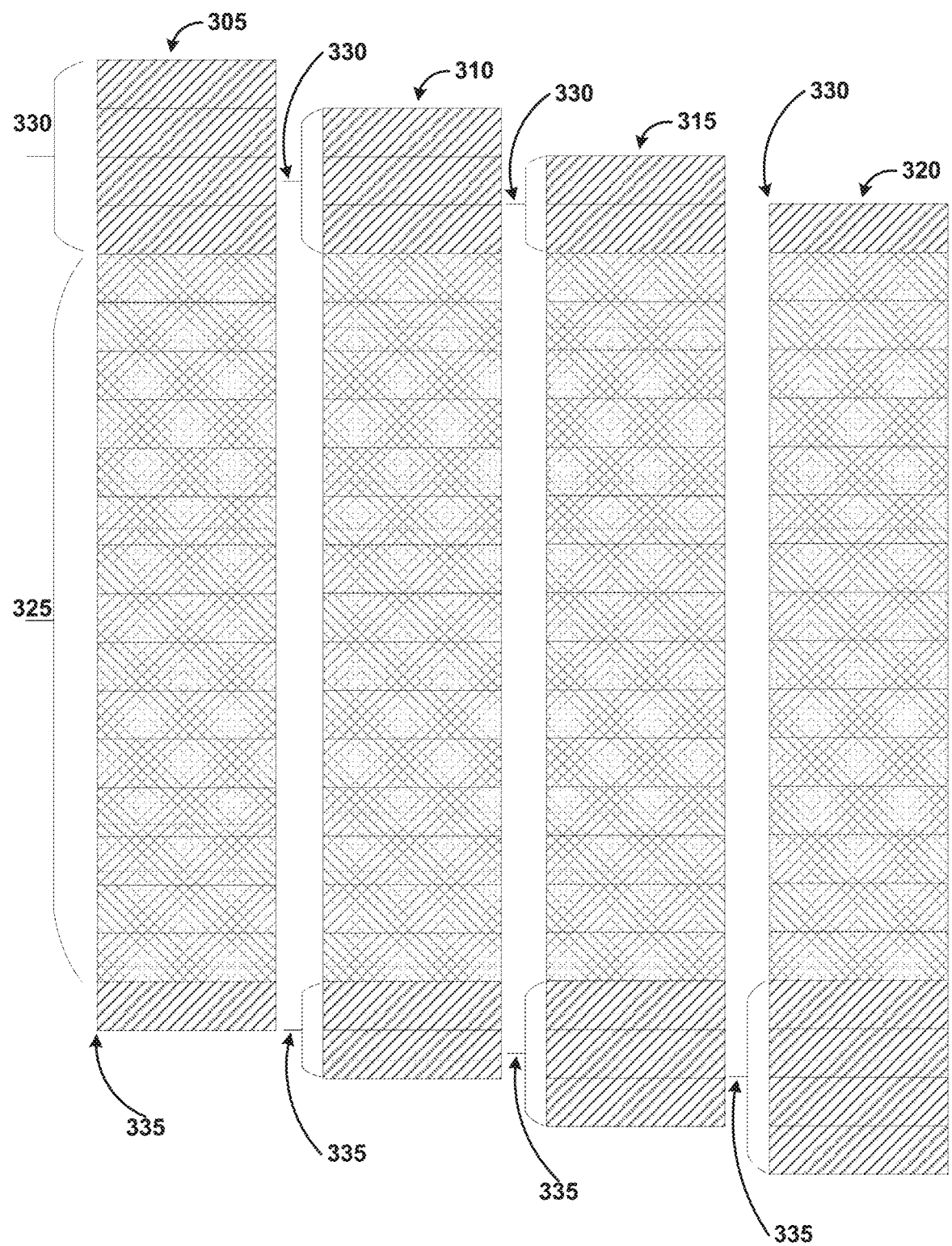
FIG. 3 is a block diagram illustrating puncturing patterns for a synchronization signal block according to an example embodiment.

FIG. 3 is a block diagram illustrating puncturing patterns for an SSB according to an example embodiment where 15 PRBs are available. As shown in FIG. 3, An SSB can include 20 PRBs. In a first SSB puncturing pattern 305 five (5) PRBs 330, 335 are punctured. In the first SSB puncturing pattern 305 PRBs 325 can be transmitted PRBs (e.g., PRB's including a PSS, SSS, and/or PBCH). On either side of the transmitted PRBs 325 are punctured PRBs 330, 335. In the first SSB puncturing pattern 305, the pattern can include four (4) punctured PRBs 330 on a first side of the transmitted PRBs 325 and one (1) punctured PRB 335 on a second side of the transmitted PRBs 325 leaving 15 PRBs unaffected and actually available.

In a second SSB puncturing pattern 310 five (5) PRBs 330, 335 are punctured. In the second SSB puncturing pattern 310 PRBs 325 can be transmitted PRBs (e.g., PRB's including a PSS, SSS, and/or PBCH). On either side of the transmitted PRBs 325 are punctured PRBs 330, 335. In the second SSB puncturing pattern 310, the pattern can include three (3) punctured PRBs 330 on a first side of the transmitted PRBs 325 and two (2) punctured PRBs 335 on a second side of the transmitted PRBs 325 leaving 15 PRBs unaffected and actually available.

In a third SSB puncturing pattern 315 five (5) PRBs 330, 335 are punctured. In the third SSB puncturing pattern 315 PRBs 325 can be transmitted PRBs (e.g., PRB's including a PSS, SSS, and/or PBCH). On either side of the transmitted PRBs 325 are punctured PRBs 330, 335. In the third SSB puncturing pattern 315, the pattern can include two (2) punctured PRBs 330 on a first side of the transmitted PRBs 325 and three (3) punctured PRBs 335 on a second side of the transmitted PRBs 325 leaving 15 PRBs unaffected and actually available.

In a fourth SSB puncturing pattern 320 five (5) PRBs 330, 335 are punctured. In the fourth SSB puncturing pattern 320 PRBs 325 can be transmitted PRBs (e.g., PRB's including a PSS, SSS, and/or PBCH). On either side of the transmitted PRBs 325 are punctured PRBs 330, 335. In the fourth SSB puncturing pattern 320, the pattern can include one (1) punctured PRB 330 on a first side of the transmitted PRBs 325 and four (4) punctured PRBs 335 on a second side of the transmitted PRBs 325 leaving 15 PRBs unaffected and actually available. Using the above techniques to determine an RB offset and CORESET frequency location, any of the SSB puncturing pattern 305, 310, 315, 320 can be used and partial CCEs can be avoided.

Figure 4:
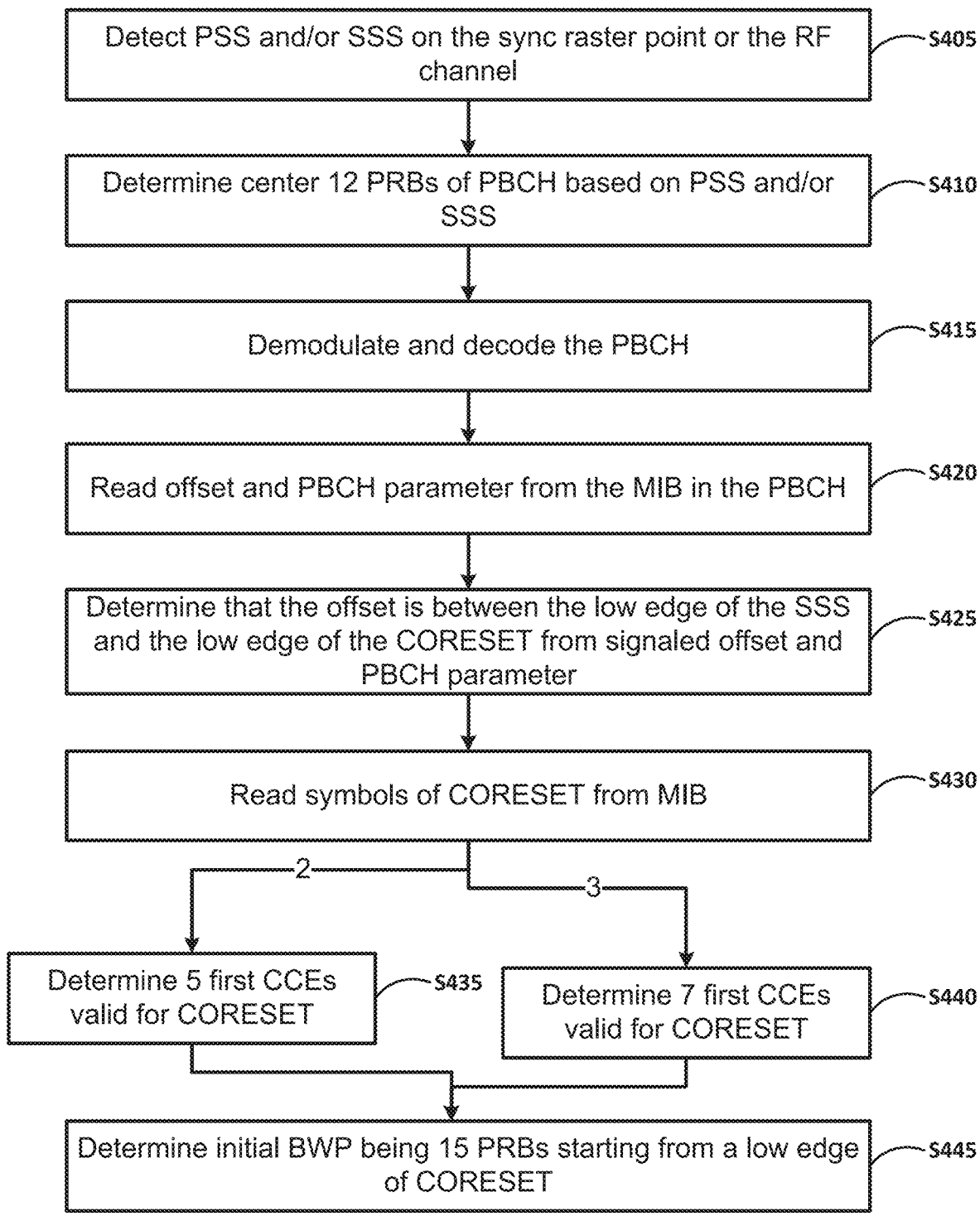
FIG. 4 is a block diagram of a method of determining an initial bandwidth part according to an example embodiment.

FIG. 4 is a block diagram of a method of determining an initial bandwidth part according to an example embodiment. As shown in FIG. 4, in step S405 a PSS and/or an SSS are detected on the synchronization raster point or the RF channel. For example, the synchronization raster can indicate the frequency positions of the synchronization block that can be used by the UE for system acquisition. The synchronization raster can be defined for each band, which is a subset of the SSB frequency. The synchronization raster can define the mapping of nPRB=10 of the SSB. The RF channel can be based on the SSB numerology and/or bandwidth. In an example implementation the techniques described herein can be triggered based on the synchronization raster point or the RF channel. The PSS (e.g., PSS 210) and/or SSS (e.g., SSS 215) can be detected and/or read on the SSB associated with the synchronization raster point or the RF channel.

In step S410 a center 12 PRBs of PBCH is determined based on the PSS and/or the SSS. For example, the center 12 PRBs of PBCH (e.g., PBCH 205) can be centered in frequency with the PSS and/or the SSS. However, the PSS and/or the SSS can be associated with 127 subcarriers (or 10 PRBs) and the 12 PRBs of the PBCH SSS can be associated with 144 subcarriers. Therefore, the PRBs of the PBCH that match with the PSS and/or the SSS can be extended by one (1) PRB in each direction to include the center 12 PRBs of the PBCH.

In step S415 the PBCH is demodulated and decoded. For example, the demodulation can be OFDM quadrature amplitude modulation (QAM) demodulation. The QAM demodulation can reproduce a bit stream from each subcarrier, which is then multiplexed (MUX) to recreate the original single data stream. Decoding the PBCH can include decoding the recreated data stream. In an example implementation, decoding the PBCH includes identifying and reading the master information block (MIB).

In step S420 an offset and PBCH parameter (e.g., k_SSB) are read from the MIB in the PBCH. For example, the offset can be included in a field of the MIB. The field can be a ssb-SubcarrierOffset field. The offset can be an integer number (e.g., 0, . . . , 15). The PBCH parameter can be k_SSB. The k_SSB can be used to set the subcarrier offset between the first subcarrier of SS/PBCH and the last subcarrier of RB Offset (15 kHz|60 kHz). The k_SSB can be an integer number (e.g., 0, . . . , 23).

In step S425 whether the offset is between the low edge of the SSS and the low edge of the CORESET is determined from signaled offset and PBCH parameter. For example, referring to FIG. 2B and 2D whether or not the offset can be offset 235 is determined.

In step S430 the number of symbols of CORESET are read from the MIB. For example, a field in the MIB can indicate the number of CORESET (e.g., CORESET #0) symbols. The field can be the pdcch-ConfigSIB1. The pdcch-ConfigSIB1 can be an integer number (e.g., 0, . . . , 255). The pdcch-ConfigSIB1 can be used to determine a bandwidth for PDCCH/SIB, a CORESET, and/or a common search space and necessary PDCCH parameters as an index to a row in a pre-defined table.

In step S435 the first five (5) CCEs valid for CORESET are determined or in step S440 the first seven (7) CCEs valid for CORESET are determined. For example, if the CORESET is indicated to be two (2) symbols, step S435 is performed and the first five (5) CCEs valid for CORESET are determined. If the CORESET is indicated to be three (3) symbols, step S440 is performed and the first seven (7) CCEs valid for CORESET are determined. CCE's are described in more detail above.

In step S445 an initial bandwidth part (BWP) is determined as the 15 PRBs starting from a low edge of CORESET. A BWP can be a contiguous set of physical resource blocks selected from the set of common resource blocks for a given numerology ($\mu$) on a given carrier. The initial BWP can be used by the UE for initial cell selection. The initial BWP can include parameters like RMSI (Remaining Minimum System Information), CORESET and RMSI Frequency location/bandwidth/SCS.

Figure 5:
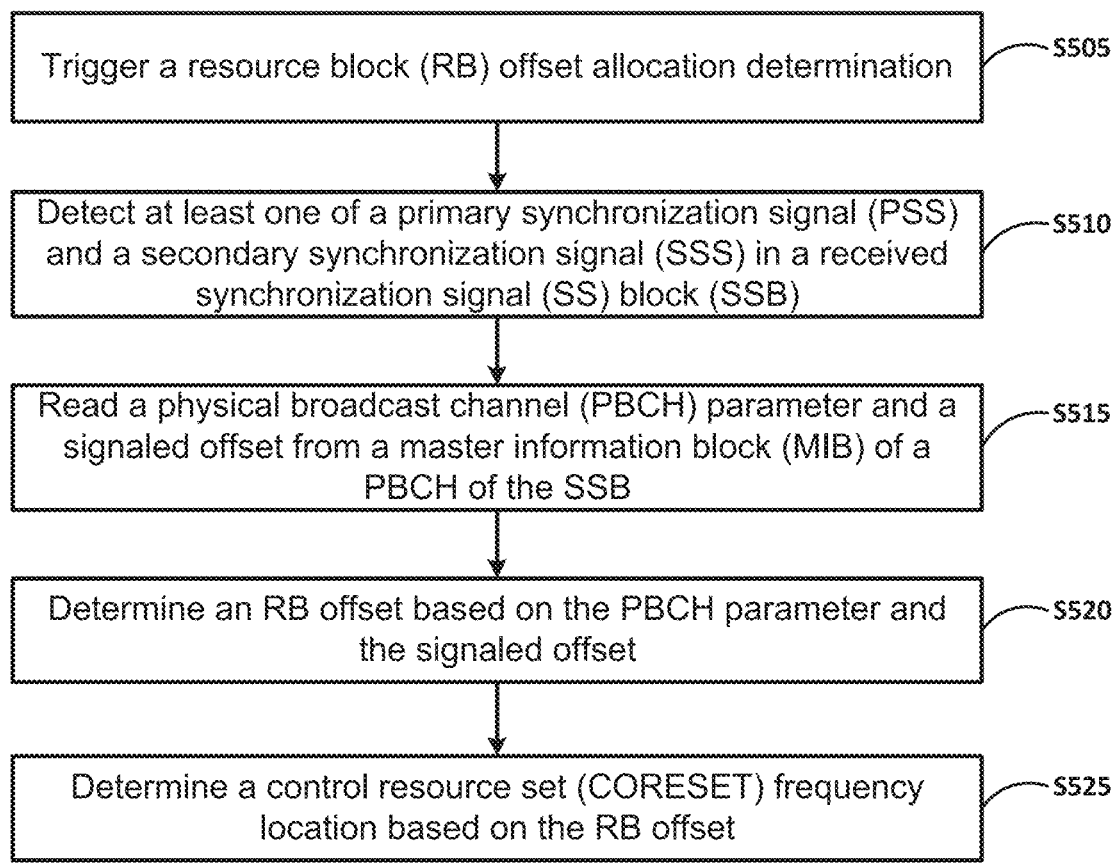
FIG. 5 is a block diagram of a method of determining a control resource set (CORESET) frequency location in a punctured synchronization signal block according to an example embodiment.

Example 1. FIG. 5 is a block diagram of a method of determining, by a user equipment, a control resource set (CORESET) frequency location from a punctured synchronization signal block according to an example embodiment. As shown in FIG. 5, in step S505 a resource block (RB) offset allocation determination is triggered. In step S510 at least one of a primary synchronization signal (PSS) and a secondary synchronization signal (SSS) is detected in a received synchronization signal (SS) block (SSB). In step S515 a physical broadcast channel (PBCH) parameter and a signaled offset are read from a master information block (MIB) of a PBCH of the SSB. In step S520 an RB offset is determined based on the PBCH parameter and the signaled offset. In step S525 a control resource set (CORESET) frequency location is determined based on the RB offset.

Example 2. The method of Example 1, wherein the PBCH parameter can be a subcarrier offset (k_SSB).

Example 3. The method of Example 1, wherein the triggering of the RB offset allocation determination can be based on a pre-defined synch raster point.

Example 4. The method of Example 1, the triggering of the RB offset allocation determination can be based on a radio frequency (RF) channel.

Example 5. The method of Example 1, wherein the RB offset can be a difference between a low edge of one of the PSS or the SSS and a low edge of the CORESET.

Example 6. The method of Example 1, wherein the RB offset can be a difference between a low edge of the SSB and a low edge of the CORESET.

Example 7. The method of Example 1, the PBCH parameter can be a k_SSB and the RB offset can be determined using a table including the k_SSB and the signalled offset.

Example 8. The method of Example 1, wherein the RB offset can be determined using a table including an index signalled in the MIB.

Example 9. The method of Example 1, wherein the SSB can include at least one Physical Resource Block (PRB) that has been punctured.

Example 10. The method of Example 1, wherein the SSB can include five (5) PRBs that has been punctured with at least one PRB punctured on each side of the PBCH.

Example 11. The method of Example 1, the SSB can be a punctured SSB and the determined CORESET frequency location, in frequency, can be aligned with at least one of a low end of the CORESET can be aligned with a low end of the punctured SSB, a CCE boundary of the CORESET can be aligned with the low end of the punctured SSB, or the CCE boundary of the CORESET can be aligned with a high end of the punctured SSB.

Example 12. The method of Example 1 can further comprise monitoring, by the UE, a Type0_PDCCH from the determined CORESET.

Example 13. The method of Example 1 can further comprise in response to detecting PDCCH for SIB1, receiving, by the UE, PDSCH based on the detected PDCCH.

Figure 6:
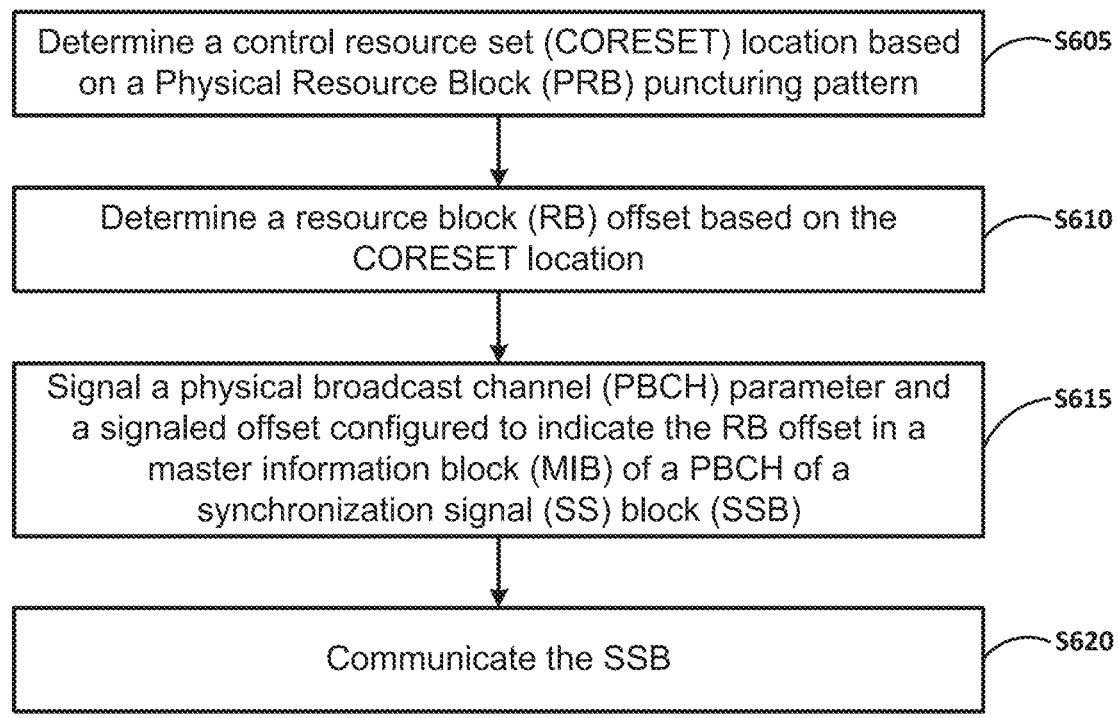
FIG. 6 is a block diagram of a method of communicating a punctured synchronization signal block according to an example embodiment.

Example 14. FIG. 6 is a block diagram of a method of communicating, by a network device, a punctured synchronization signal block according to an example embodiment. As shown in FIG. 6, in step S605 a control resource set (CORESET) frequency location is determined based on a Physical Resource Block (PRB) puncturing pattern. In step S610 a resource block (RB) offset is determined based on the CORESET location. In step S615 a physical broadcast channel (PBCH) parameter and a signaled offset configured is signaled to indicate the RB offset in a master information block (MIB) of a PBCH of a synchronization signal (SS) block (SSB). In step S620 the SSB is communicated.

Example 15. The method of Example 14, wherein the PBCH parameter can be a subcarrier offset (k_SSB).

Example 16. The method of Example 14, wherein the RB offset can be a difference between a low edge of one of a primary synchronization signal (PSS) or a secondary synchronization signal (SSS) and a low edge of the CORESET.

Example 17. The method of Example 14, wherein the RB offset can be a difference between a low edge of the SSB and a low edge of the CORESET.

Example 18. The method of Example 14, wherein the PBCH parameter can be a k_SSB and the RB offset can be determined using a table including the k_SSB and the signaled offset.

Example 19. The method of Example 14, wherein the RB offset can be determined using a table including an index signaled in the MIB.

Example 20. The method of Example 14, wherein the SSB can include at least one Physical Resource Block (PRB) that has been punctured.

Example 21. The method of Example 14, wherein the SSB can include five (5) PRBs that has been punctured with at least one PRB punctured on each side of the PBCH.

Example 22. The method of Example 14, wherein the determined CORESET frequency location, in frequency, can be aligned with at least one of a low end of the CORESET can be aligned with a low end of the punctured SSB, a CCE boundary of the CORESET can be aligned with the low end of the punctured SSB, or the CCE boundary of the CORESET can be aligned with a high end of the punctured SSB.

Example 23. A non-transitory computer-readable storage medium comprising instructions stored thereon that, when executed by at least one processor, are configured to cause a computing system to perform the method of any of Examples 1-22.

Example 24. An apparatus comprising means for performing the method of any of Examples 1-22.

Example 25. An apparatus comprising at least one processor and at least one memory including computer program code, the at least one memory and the computer program code configured to, with the at least one processor, cause the apparatus at least to perform the method of any of Examples 1-22.

Figure 7:
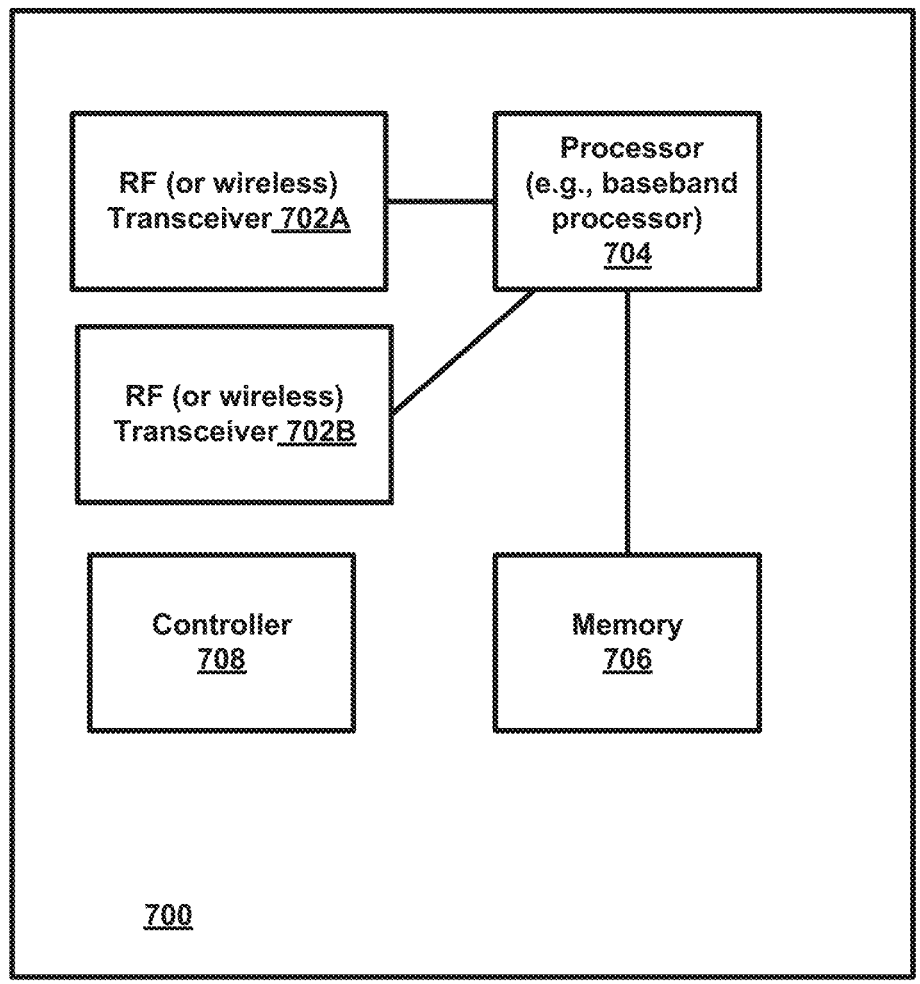
FIG. 7 is a block diagram of a wireless station or wireless node (e.g., AP, BS, gNB, RAN node, relay node, UE or user device, network node, network entity, DU, CU-CP, CU-CP, . . . or other node) according to an example embodiment.

FIG. 7 is a block diagram of a wireless station 700 or wireless node or network node 700 according to an example embodiment. The wireless node or wireless station or network node 700 may include, e.g., one or more of an AP, BS, gNB, RAN node, relay node, UE or user device, network node, network entity, DU, CU-CP, CU-UP, . . . or other node) according to an example embodiment.

The wireless station 700 may include, for example, one or more (e.g., two as shown in FIG. 7) radio frequency (RF) or wireless transceivers 702A, 702B, where each wireless transceiver includes a transmitter to transmit signals and a receiver to receive signals. The wireless station also includes a processor or control unit/entity (controller) 704 to execute instructions or software and control transmission and receptions of signals, and a memory 706 to store data and/or instructions.

Processor 704 may also make decisions or determinations, generate frames, packets or messages for transmission, decode received frames or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the station 700, and may provide control for other systems not shown in FIG. 7, such as controlling input/output devices (e.g., display, keypad), and/or may execute software for one or more applications that may be provided on wireless station 700, such as, for example, an email program, audio/video applications, a word processor, a Voice over IP application, or other application or software.

In addition, a storage medium may be provided that includes stored instructions, which when executed by a controller or processor may result in the processor 704, or other controller or processor, performing one or more of the functions or tasks described above.

According to another example embodiment, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

The example embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Example embodiments of the various techniques described herein may be implemented in digital electronic circuitry, or in computer hardware, firmware, software, or in combinations of them. Example embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, example embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    triggering, by a user equipment (UE), a resource block (RB) offset allocation determination;
    detecting, by the UE, at least one of a primary synchronization signal (PSS) and a secondary synchronization signal (SSS) in a received synchronization signal (SS) block (SSB);
    reading, by the UE, a physical broadcast channel (PBCH) parameter and a signaled offset from a master information block (MIB) of a PBCH of the SSB;
    determining, by the UE, an RB offset based on the PBCH parameter and the signaled offset, wherein the RB offset is a difference between a low edge of one of the PSS or the SSS and a low edge of a control resource set (CORESET); and
    determining, by the UE, a frequency location of the CORESET based on the RB offset.

2. An apparatus comprising:
    at least one processor; and
    at least one memory including computer program code;
    the at least one memory and the computer program code configured to, with the at least one processor, cause the apparatus at least to:
    trigger a resource block (RB) offset allocation determination;
    detect at least one of a primary synchronization signal (PSS) and a secondary synchronization signal (SSS) in a received synchronization signal (SS) block (SSB);
    read a physical broadcast channel (PBCH) parameter and a signaled offset from a master information block (MIB) of a PBCH of the SSB;
    determine an RB offset based on the PBCH parameter and the signaled offset, wherein the RB offset is a difference between a low edge of one of the PSS or the SSS and a low edge of a control resource set (CORESET); and
    determine a frequency location of the CORESET based on the RB offset.

3. The apparatus of claim 2, wherein the PBCH parameter is a subcarrier offset (k_SSB).

4. The apparatus of claim 2, wherein the triggering of the RB offset allocation determination is based on a pre-defined synch raster point.

5. The apparatus of claim 2, wherein the triggering of the RB offset allocation determination is based on a radio frequency (RF) channel.

6. The apparatus of claim 2, wherein the RB offset is determined using a table including an index signaled in the MIB.

7. The apparatus of claim 2, wherein the at least one memory and the computer program code are further configured to, with the at least one processor, cause the apparatus at least to:
    monitor a Type0_PDCCH from the CORESET.

8. The apparatus of claim 2, wherein the at least one memory and the computer program code are further configured to, with the at least one processor, cause the apparatus at least to:
    in response to detecting physical downlink control channel for system information block 1, receive a physical downlink shared channel based on the detected physical downlink control channel.

9. An apparatus comprising:
    at least one processor; and at least one memory including computer program code;

the at least one memory and the computer program code configured to, with the at least one processor, cause the apparatus to:

determine a frequency location of a control resource set (CORESET) based on a Physical Resource Block (PRB) puncturing pattern;

determine a resource block (RB) offset based on the frequency location of the CORESET;

signal a physical broadcast channel (PBCH) parameter and an offset configured to indicate the RB offset in a master information block (MIB) of a PBCH of a synchronization signal (SS) block (SSB), wherein the RB offset is a difference between a low edge of one of a primary synchronization signals (PSS) or a secondary synchronization signal (SSS) in the SSB and a low edge of the CORESET; and communicate the SSB.

10. The apparatus of claim 9, wherein the at least one memory and the computer program code are further configured to, with the at least one processor, cause the apparatus at least to trigger a determination of an allocation of the RB offset based on a pre-defined synch raster point.

11. The apparatus of claim 9, wherein the at least one memory and the computer program code are further configured to, with the at least one processor, cause the apparatus at least to trigger a determination of an allocation of the RB offset based on a radio frequency (RF) channel.

12. The apparatus of claim 9, wherein the RB offset is determined using a table including an index signaled in the MIB.

* * * * *